United States Patent
Sjöland

(10) Patent No.: US 10,079,671 B2
(45) Date of Patent: Sep. 18, 2018

(54) CIRCUIT AND METHOD FOR PROVIDING AN ADJUSTABLE IMPEDANCE

(71) Applicant: Telefonaktiebolaget LM Ericsson (publ), Stockholm (SE)

(72) Inventor: Henrik Sjöland, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 165 days.

(21) Appl. No.: 15/117,219

(22) PCT Filed: Feb. 20, 2014

(86) PCT No.: PCT/EP2014/053371
§ 371 (c)(1),
(2) Date: Aug. 8, 2016

(87) PCT Pub. No.: WO2015/124195
PCT Pub. Date: Aug. 27, 2015

(65) Prior Publication Data
US 2016/0352496 A1    Dec. 1, 2016

(51) Int. Cl.
*H04L 5/14*    (2006.01)
*H04B 1/18*    (2006.01)
*H04B 1/525*    (2015.01)

(52) U.S. Cl.
CPC ............. *H04L 5/1461* (2013.01); *H04B 1/18* (2013.01); *H04B 1/525* (2013.01)

(58) Field of Classification Search
CPC . H04B 1/005; H04B 1/18; H04B 1/38; H04B 1/40; H04B 1/403; H04B 1/406;
(Continued)

(56) References Cited

U.S. PATENT DOCUMENTS

| | | | |
|---|---|---|---|
| 6,597,900 B1* | 7/2003 | Marshall | H03D 7/165 329/306 |
| 2002/0067208 A1* | 6/2002 | Ugajin | H03F 3/45179 330/258 |

(Continued)

FOREIGN PATENT DOCUMENTS

| | | |
|---|---|---|
| EP | 2290830 A2 | 3/2011 |
| EP | 2587679 A1 | 5/2013 |

(Continued)

*Primary Examiner* — Young T Tse
(74) *Attorney, Agent, or Firm* — Coats & Bennett, PLLC

(57) ABSTRACT

An electronic circuit (51) configured to provide an adjustable impedance at a first frequency comprises a transconductance amplifier (52) arranged to provide a current signal proportional to an input signal at an input terminal; at least one conversion arrangement, each comprising a mixer arrangement (53) utilizing a first local oscillator signal at said frequency to down-convert the current signal to a baseband voltage signal; a filtering arrangement (54, 55) connected to said mixer arrangement (53) and comprising at least a resistor and a capacitor in parallel; and a mixer arrangement (56) utilizing a second local oscillator signal at said frequency to up-convert a voltage signal present at the filter arrangement to an up-converted voltage signal; and a transconductance amplifier (57) arranged to provide a second current signal proportional to the up-converted voltage signal and to feed back said second current signal to the input terminal of the electronic circuit.

15 Claims, 9 Drawing Sheets

(58) Field of Classification Search
CPC .. H04B 1/48; H04B 1/525; H04B 1/54; H04L 5/1461
USPC .... 375/257, 259, 278, 284, 285; 330/84–86, 330/98–100, 105, 107; 455/63.1, 67.3, 455/86–88, 500, 501
See application file for complete search history.

(56) References Cited

U.S. PATENT DOCUMENTS

| | | | | |
|---|---|---|---|---|
| 2009/0027091 | A1* | 1/2009 | Yamaguchi | H03K 27/00 327/118 |
| 2010/0035563 | A1* | 2/2010 | Mikhemar | H04B 1/18 455/78 |
| 2011/0064004 | A1 | 3/2011 | Michemar et al. | |
| 2011/0299433 | A1 | 12/2011 | Darabi et al. | |
| 2013/0241670 | A1* | 9/2013 | Mikhemar | H04B 1/52 333/126 |

FOREIGN PATENT DOCUMENTS

| | | |
|---|---|---|
| EP | 2672631 A1 | 12/2013 |
| GB | 2365235 | 2/2002 |
| WO | 2011036331 A1 | 3/2011 |

\* cited by examiner

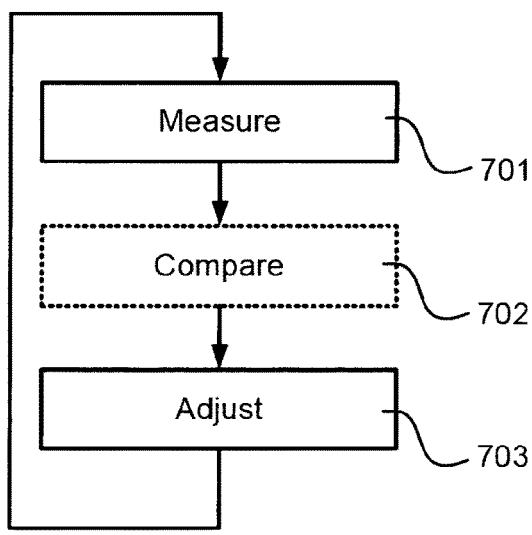
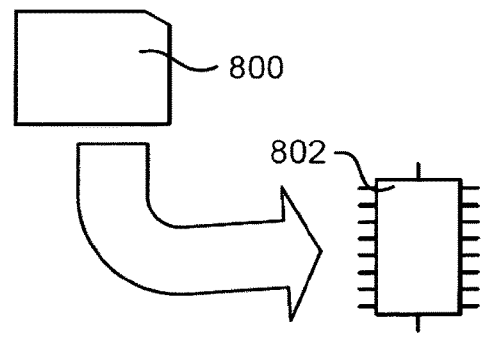
Fig. 13                    Fig. 14
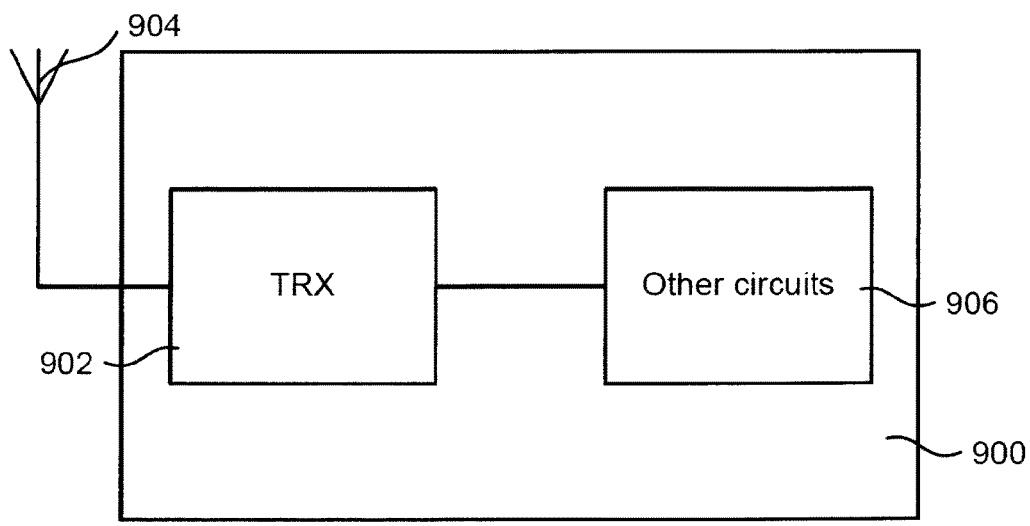
Fig. 15

CIRCUIT AND METHOD FOR PROVIDING AN ADJUSTABLE IMPEDANCE

TECHNICAL FIELD

The invention relates to an electronic circuit configured to provide an adjustable impedance at a given frequency or frequencies, a circuit arrangement, a transceiver arrangement, and a method of providing an adjustable impedance.

BACKGROUND

Several applications exist where a circuit that can provide an adjustable impedance at a given frequency (or frequencies) or frequency range (or ranges) is desired or will be advantageous.

One example is transceivers, which are commonly used in a variety of communications devices and comprise a transmitter as well as a receiver.

Such transceivers can be arranged to be operated in semi-duplex, i.e. the receiver and transmitter operate separated in time to prevent the transmitter signal from concealing the received signal. This approach is therefore commonly referred to as time division duplex (TDD).

Transceivers can also be operated in full duplex, i.e. the receiver and transmitter operate simultaneously. In this case, arrangements are provided to prevent the transmitter from concealing the received signal. One approach to achieve this is to assign different frequencies for transmission and reception. This approach is therefore commonly referred to as frequency division duplex (FDD). Often the receiver and the transmitter use the same antenna, or antenna system that may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver.

In other words, receivers for FDD cellular radio equipment may be subject to very strong signals from their own transmitter. These strong transmit signals are present at duplex distance from the receive channel. The typical duplex distances are small compared to the carrier frequency (typically less than 100 MHz). The receiver must be shielded or isolated from these high power level signals in order to achieve good sensitivity. Currently, this may be achieved by using off-chip acoustic wave duplex filters, called duplexers. A duplexer is arranged to direct radio frequency (RF) signals from the transmitter to the antenna and from the antenna to the receiver. It may e.g. comprise a circulator. Unfortunately duplexers are expensive and bulky, thus increasing the number of components and the required board area. It is also a challenge to implement duplexers on-chip. This is further pronounced by the increasing number of frequency bands to support. Therefore, an integrated solution that performs the isolation function is highly desirable.

Some solutions exist for realizing an on-chip isolation device. One example is disclosed in US 2011/064004, which shows an RF front-end that provides isolation by electrical balance. It is based on cancellation and uses a transformer. For cancellation of transmit signals to occur at the receiver input, symmetry is necessary, and the circuit thus requires a dummy load or balancing impedance, which should be equal to the antenna impedance for perfect cancellation. Although the disclosed balance network is tunable, it does not consider that the antenna impedance is complex (inductive or capacitive) and varies with frequency as well as antenna surroundings. Further, the disclosed balance network is not capable of providing separately tunable impedances at the receive frequency and at the transmit frequency, which is needed since the receive and transmit frequencies are far enough apart for the antenna to present quite different impedances, but still with a frequency distance that is small compared to the carrier frequency.

SUMMARY

Therefore, it is an object of embodiments of the invention to provide an electronic circuit that can provide an adjustable impedance at a given frequency or a narrow frequency range and at the same time provide a high impedance at frequencies away from that frequency or frequency range, thus allowing two or more circuits tuned to different frequencies to be coupled in parallel to provide different impedances at nearby frequencies.

According to embodiments of the invention the object is achieved in an electronic circuit configured to provide an adjustable impedance at a first frequency, said circuit comprising a first transconductance amplifier arranged to receive an input signal at an input terminal of the electronic circuit and provide a first current signal proportional to said input signal; at least one conversion arrangement, each comprising a first mixer arrangement arranged to utilize a first local oscillator signal at said first frequency to down-convert said first current signal to a baseband voltage signal at an output of the mixer arrangement; a filtering arrangement connected to the output of said first mixer arrangement and comprising at least a resistor and a capacitor in parallel; and a second mixer arrangement arranged to utilize a second local oscillator signal at said first frequency to up-convert a voltage signal present at said filter arrangement to an up-converted voltage signal at its output; and a second transconductance amplifier arranged to receive said up-converted voltage signal and provide a second current signal proportional thereto and to feed back said second current signal to the input terminal of the electronic circuit.

By using the first and second mixer arrangements in this way the filtering arrangement implemented with a resistor and a capacitor (which can also be considered as a narrow band baseband impedance) can be up-converted to radio frequencies. In this way, a sharp frequency response, corresponding to a high quality factor, can be achieved using a frequency translation technique without the need for very high quality factor inductors. By making the bandwidth of the baseband impedance sufficiently narrow two or more translated impedance circuits can be used at nearby frequencies with limited interaction.

In some embodiments, one of said first and second transconductance amplifiers is an inverting transconductance amplifier, while the other one is a non-inverting transconductance amplifier. This ensures low frequency stability of the circuit.

When at least one of said first and second transconductance amplifiers has a controllable gain, the magnitude of the provided impedance can be adjusted by controlling the controllable transconductance amplifier gain. A similar result can be achieved when at least one of the resistor and the capacitor of said filtering arrangement is controllable.

When said second local oscillator signal has a phase offset with respect to said first local oscillator signal, impedances can be provided with different phase angles. When said phase offset is controllable, also the phase angle of the provided impedance can be controlled.

The electronic circuit may comprise two conversion arrangements, with the first local oscillator signals of the two conversion arrangements having a phase difference different from 0 degrees and different from 180 degrees. In this way the circuit can also provide the desired impedance in situations where the input signal to the circuit does not have the same frequency and the same phase as the first local oscillator signal. In one embodiment the first local oscillator signals of the two conversion arrangements have a phase difference equal to 90 degrees.

Alternatively, the electronic circuit may comprise at least three conversion arrangements, with the first local oscillator signals of the conversion arrangements having symmetrical phase distribution over 360 degrees. In one embodiment, the electronic circuit comprises four conversion arrangements, with the first local oscillator signals of the four conversion arrangements having quadrature phases.

A nominal impedance may be placed in parallel to the input terminal of the electronic circuit.

A circuit arrangement may comprise at least two electronic circuits as described above connected to a common input terminal, the at least two electronic circuits utilizing local oscillator signals at different frequencies to provide an adjustable impedance at each of said different frequencies. In this way the circuit arrangement can at the same time provide different impedances at different frequencies, such as a receiving and a transmitting frequency of a transceiver.

A transceiver arrangement may comprise a receiver arranged for frequency-division duplex communication with a communication network; a transmitter arranged for frequency-division duplex communication with the communication network; a transmission port for connecting to an antenna; a balancing impedance circuit comprising a circuit arrangement as described above and arranged to mimic the impedance at the transmission port; and a filtering arrangement, which comprises filters of a first type and filters of a second type, connecting the receiver, transmitter, transmission port and balancing impedance circuit, wherein the filters of the first type are arranged to pass signals at transmitter frequency and attenuate signals at receiver frequency and are connected between the transmitter and the transmission port and between the receiver and the balancing impedance circuit; and the filters of the second type are arranged to attenuate signals at transmitter frequency and pass signals at receiver frequency and are connected between the transmitter and the balancing impedance circuit and between the receiver and the transmission port.

The transceiver arrangement may further comprise an amplitude detector arrangement at at least a terminal of an input port of the receiver, wherein the transceiver arrangement comprises a controller arranged to control the adjustable impedance of the balancing impedance circuit such that the amplitude at the at least one terminal of an input port of the receiver is reduced based on measurements by the amplitude detector arrangement. In this way the balancing impedance circuit can be controlled to mimic an antenna impedance.

The controller may be arranged to control a magnitude of the adjustable impedance of the balancing impedance circuit by controlling at least one of a controllable gain of said first transconductance amplifier, a controllable gain of said second transconductance amplifier, and the resistor of said filtering arrangement.

The controller may further be arranged to control a phase of the adjustable impedance of the balancing impedance circuit by controlling a phase offset of said second local oscillator signal with respect to said first local oscillator signal.

A communication device, capable of frequency division duplex communication via a communication network, may comprise a transceiver arrangement as described above.

As mentioned, the invention further relates to a method of providing an adjustable impedance at a first frequency, the method comprising the steps of providing by a first transconductance amplifier a first current signal proportional to an input signal received at an input terminal of an electronic circuit; down-converting in a first mixer arrangement of at least one conversion arrangement said first current signal to a baseband voltage signal by utilizing a first local oscillator signal at said first frequency; filtering in a filtering arrangement of said at least one conversion arrangement comprising at least a resistor and a capacitor in parallel said baseband voltage signal to provide a voltage signal at the filtering arrangement; up-converting in a second mixer arrangement of said at least one conversion arrangement said voltage signal present at said filter arrangement to an up-converted voltage signal by utilizing a second local oscillator signal at said first frequency; providing by a second transconductance amplifier a second current signal proportional to said up-converted voltage signal; and feeding back said second current signal to the input terminal of the electronic circuit.

By using the first and second mixer arrangements in this way the filtering arrangement implemented with a resistor and a capacitor (which can also be considered as a narrow band baseband impedance) can be up-converted to radio frequencies. In this way, a sharp frequency response, corresponding to a high quality factor, can be achieved using a frequency translation technique without the need for very high quality factor inductors. By making the bandwidth of the baseband impedance sufficiently narrow two or more translated impedance circuits can be used at nearby frequencies with limited interaction.

The method may further comprise the step of controlling a magnitude of the adjustable impedance by controlling at least one of a controllable gain of said first transconductance amplifier, a controllable gain of said second transconductance amplifier, and the resistor of said filtering arrangement.

The method may further comprise the step of controlling a phase of the adjustable impedance by controlling a phase offset of said second local oscillator signal with respect to said first local oscillator signal.

BRIEF DESCRIPTION OF THE DRAWINGS

Embodiments of the invention will now be described more fully below with reference to the drawings, in which

FIG. 13 shows a flow chart of a method of controlling an adjustable impedance circuit;

FIG. 14 schematically illustrates a computer program and a processor; and

FIG. 15 shows a block diagram schematically illustrating a communications device.

DETAILED DESCRIPTION

Figure 1:
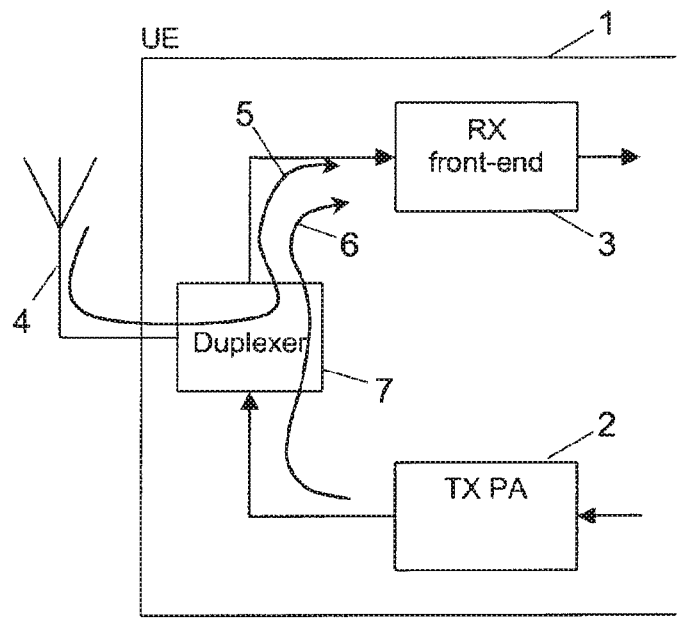
FIG. 1 shows a known transceiver of a frequency division duplex (FDD) cellular radio equipment.

To illustrate an example of the utilization of embodiments of the invention, FIG. 1 shows a known communications circuit in the form of a transceiver 1 of a frequency division duplex (FDD) cellular radio equipment. The transceiver 1 comprises a transmitter 2 and a receiver 3, which are both connected to a common antenna 4. In a frequency division duplex transceiver the transmitter and the receiver uses different frequencies in the same frequency band, separated by the so-called duplex distance, which is normally small compared to the carrier frequency (typically less than 100 MHz). This means that in addition to the signals received from the antenna 4, illustrated by the arrow 5, the receiver 3 is also subject to very strong signals from the transceiver's own transmitter 2, illustrated by the arrow 6.

The receiver 3 is shielded or isolated from these high power level signals by a duplexer 7, which may be an acoustic wave duplex filter. The duplexer 7 is arranged to direct radio frequency (RF) signals from the transmitter 2 to the antenna 4 and from the antenna 4 to the receiver 3. Unfortunately, duplexers are expensive and bulky, thus increasing the number of components and the required board area of the transmitter. It is also a challenge to implement duplexers on-chip. This is further pronounced by the increasing number of frequency bands to support.

Figure 2:
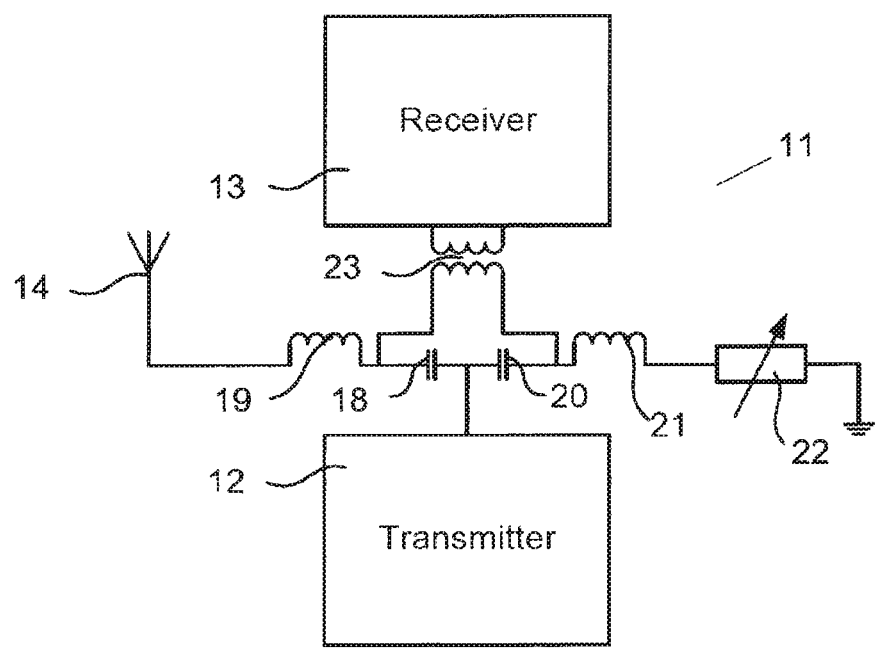
FIG. 2 shows another known transceiver using an on-chip solution for reducing interference from transmitter to receiver.

FIG. 2 shows an example of a transceiver 11 trying to achieve a similar effect with an on-chip solution, which is based on electrical balance using a dummy load or balancing impedance, which is arranged to be equal to (mimic) the antenna impedance for perfect cancellation. The transceiver 11 comprises a transmitter 12, a receiver 13, and an antenna 14. The transmitter 12 provides its output signal both to a branch towards the antenna 14, the branch comprising a capacitor 18 and an inductor 19, and to a branch towards a dummy load 22, the branch comprising a capacitor 20 and an inductor 21. The dummy load 22 is arranged to mimic the impedance of the antenna 14, and by the achieved symmetry, and, when using a differential input to the receiver 13 via a transformer 23, the contribution at the receiver input from the transmitted signal can be suppressed. A drawback of this solution is that half the signal energy is lost in the dummy load 22. Another drawback is that a transformer is necessary, which may be hard to implement at low cost and/or low space consumption, e.g. on chip. Below it will be described how a dummy load or balancing impedance 22 can be implemented.

Figure 3:
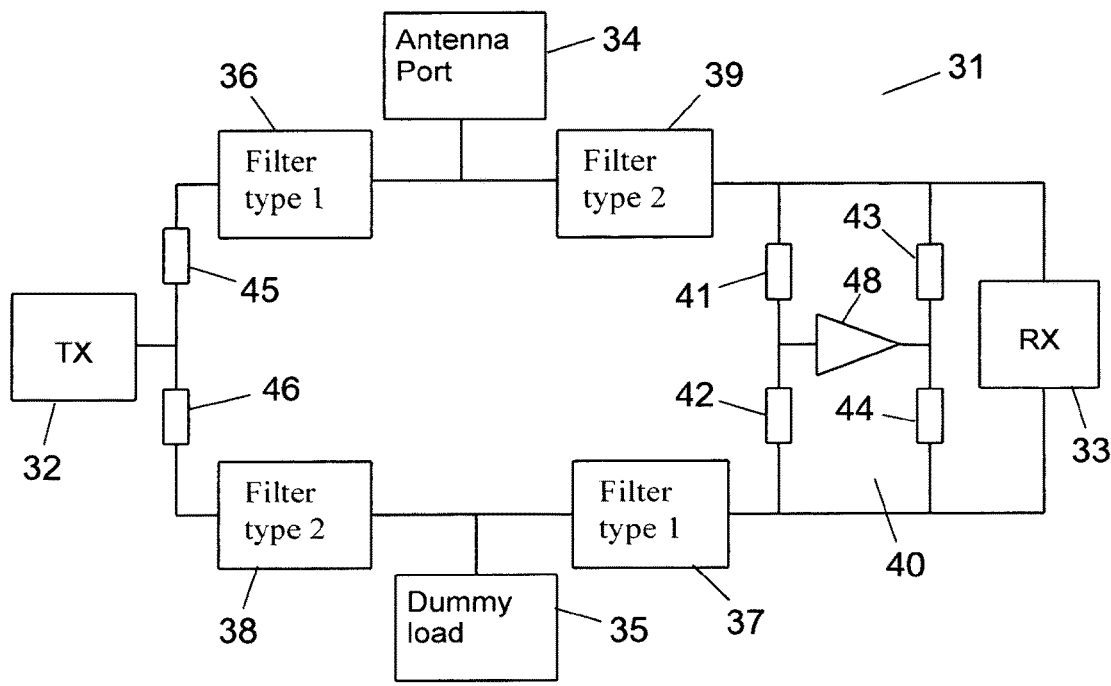
FIG. 3 shows a different transceiver using an on-chip solution for reducing interference from transmitter to receiver.

Another example of a transceiver 31 that can isolate the receiver from strong signals from the transceiver's own transmitter is suggested in FIG. 3. The transceiver 31 comprises a receiver 33 arranged for frequency-division duplex communication with a wireless communication network, a transmitter 32 arranged for frequency-division duplex communication with the wireless communication network, an antenna port 34 for connecting to an antenna, and a balancing impedance circuit 35 arranged to provide an adaptive impedance arranged to mimic the impedance at the antenna port 34. The balancing impedance circuit 35 can also be referred to as a dummy load mimicking the load presented by the antenna connected to the antenna port 34 at operation.

The receiver 33 works differentially and will not respond to common-mode signals; i.e. when identical signals are received at the two inputs of the receiver 33 ideally no output signal is produced. This provides for cancelling of transmitter signal contribution at receiver input when balancing impedance circuit 35 is perfectly mimicking the impedance at the antenna port 34, as the transmitter signal will then be in common-mode at the receiver.

The transmitter signal contribution at receiver input is further reduced by filters 36, 37, 38, 39 that are symmetrically arranged and symmetrically valued with respect to the two paths from transmitter 32 to receiver 33. They are, however, not symmetrical in sense of passing signals from the transmitter 32 towards the antenna port 34 and balancing impedance circuit 35 and passing signals from the antenna port 34 and the balancing impedance circuit 35 towards the receiver 33, as will be elucidated below.

Filters 36, 37 are of a first type which are arranged to pass signals at transmitting frequency and to attenuate signals at receiving frequency. The transmitting frequency and the receiving frequencies are distinguished by the duplex distance as described above. Filters 38, 39 are of a second type which are arranged to pass signals at the receiving frequency and attenuate signals at the transmitting frequency.

Thus, a signal at transmitting frequency from the transmitter 32 is passed via the filter 36 towards the antenna port 34 such that it is enabled to be transmitted efficiently through an antenna connected to the antenna port 34. Filter 36 also suppresses transmitter noise at the receive frequency, thus reducing the interference passed by filter 39 to the receiver input. The transmit signal is attenuated by the filter 39 to reduce interference at the input of the receiver 33. The transmit signal is attenuated by the filter 38 such that only very little transmit energy is wasted in the balancing impedance circuit 35, and filter 38 thus reduces transmit energy that can reach the receiver 33 via the path over the filter 37, which reduces interference.

A received signal from an antenna connected to the antenna port 34 reaches the receiver 33 via the filter 39, which passes the receiving signal but attenuates the transmit signal that is also present at the antenna port. Input of the receiver 33 is also connected to the balancing impedance circuit 35 via the filter 37, which also attenuates the receiving signal so that very little of the noise generated by the balancing impedance circuit 35 will reach the receiver 33 and very little signal energy of the received signal is wasted in the balancing impedance circuit 35. The received signal will be present at both input nodes of the receiver due to a common-mode signal reduction circuit 40, which will be described below.

Thus, the transceiver 31 provides a structure which efficiently provides signals from the transmitter to the antenna port, efficiently provides signals from the antenna port to the receiver, and at the same time reduces interfering signals from the transmitter reaching the receiver.

Symmetry is desired to keep the aggregate contribution by the transmitter signal at the receiver input close to zero, i.e. cancellation will then occur through the symmetrical paths of the filter 36, the antenna port 34 and the filter 39 to one of the differential input terminals of the receiver 33, and of the filter 38, the balancing impedance circuit 35 and the filter 37 to the other one of the differential input terminals of the receiver 33. This is accomplished by using the same type of filters in the paths, and by adapting the impedance of the balancing impedance circuit 35 to mimic the impedance at the antenna port 34.

To achieve cancellation of transmitter signals at the differential receiver input port, the signal transfer is preferably equal in the two paths from the transmitter 32 to the receiver 33. The signal from the transmitter will then appear completely in common-mode at the receiver input port. For this to occur, the filters are terminated by the same impedances, despite their orders being mutually reversed in the two paths. The operation of the circuit can be explained better by first assuming the amplifier 48 to be ideal, and the impedances 45,46 to be zero. The transmitter will then drive the two filters 36 and 38 with the same voltage, corresponding to zero impedance between them. By terminating the filters 37 and 39 by a zero common-mode impedance at the receiver input nodes, symmetry is ensured so that the transmitter leakage to the receiver 33 will appear as common-mode. The zero common-mode impedance, i.e. short circuit, will prevent any voltage due to transmitter interference from building up at the receiver input, which will simplify the design of the receiver, which does not need to handle strong common-mode signals and provide large common-mode rejection.

Rejecting the common-mode will still allow signals to pass from the antenna port 34 to the receiver 33 as these enter non-symmetrically, i.e. in just the upper branch to the receiver input. Note that the common-mode signal reduction circuit 40 ensures a differential input signal, however, so that the antenna signal will be present at both receiver input terminals. The common-mode signal reduction circuit 40 provides a low impedance for common-mode signals.

The common-mode signal reduction circuit 40 comprises an inverting amplifier 48, a first impedance 41, a second impedance 42, a third impedance 43 and a fourth impedance 44. The input of the inverting amplifier 48 is provided by a voltage division between the first and the second impedances 41, 42 having equal impedances, i.e. the voltage is evenly split. This voltage divided signal will thus correspond to the common-mode signal provided through the paths. The output of the amplifier 48 is provided to junction of the third and fourth impedances 43, 44 having equal impedances, which provides symmetry. The first and second impedances 41, 42, and the third and fourth impedances 43, 44, respectively, are connected in series between the filter 37 of the first type and the filter 39 of the second type, which is also the input terminals of the receiver 33. The inverting amplifier 48 will thus provide an output in response to the common-mode voltage detected by impedances 41 and 42, which is fed back through the third and fourth impedances 43, 44, i.e. a negative feedback loop.

As now will be recognised, the feedback structure will suppress the common-mode signal if the amplifier 48 provides a sufficient gain. The gain is typically selected to be somewhere between 10 and 100 to keep noise generated by the common-mode signal reduction circuit 40 to a moderate level and have gain enough to provide a low enough common-mode impedance for most situations, where a gain of about 20 is a good starting point for fine-tuning the circuit. It is to be noted that noise generated by the amplifier 48 will not be substantially suppressed at the input stage of the differential receiver 33, and thus it is advisable that the amplifier 48 should have good noise performance.

The first and second impedances 41, 42 can be capacitors, which is a benefit in sense of noise, and since the common-mode signal normally is a high-frequency signal, the use of capacitors for the voltage division will work properly. The third and fourth impedances 43, 44 can also be capacitors, which would imply the same benefits. However, as the circuit is based on symmetry, i.e. the filters of the same type need to be terminated equally, a fifth impedance 45 and a sixth impedance 46 can be arranged between the transmitter and the filter of the first type 36 and the filter of the second type 38, respectively. The purpose of these impedances 45, 46 is to compensate for the non-zero common-mode impedance of the common-mode signal reduction circuit 40, which is due to the finite gain of the amplifier 48. By making the impedance of the impedances 45, 46 equal to the common-mode impedance, symmetry is restored. The assignment of the impedances 45, 46 can be made by design or be adapted by e.g. a controller. Thus, if only capacitors are used for the third and fourth impedances 43, 44, capacitors need to be used for the fifth and sixth impedances 45, 46, too. This may however make impedance matching cumbersome, in particular if the voltage gain of the amplifier 48 is high so that the value of the compensation capacitors 45, 46 would be too large to enable a practically feasible circuit. It is therefore a benefit to include at least a resistive part for the third to sixth impedances 43 to 46.

The filters 36, 37, 38 and 39 of first and second types can be made more or less complex. As an example, one of the types may comprise an inductance coupled in parallel with a capacitance and with this parallel coupling coupled in series with an inductance between the input and output of the filter. It provides a parallel resonance attenuating the signal at a frequency below a series resonance where the signal is passed. The other type may then comprise a similar parallel coupling coupled in series with a capacitance between the input and output of the filter. It provides a series resonance frequency below the parallel resonance frequency. Depending on whether receiving frequency is higher or lower than the transmitting frequency, the filters of the first type can be selected as one of these two types and the filters of the second type can be selected as the other one of the two suggested types.

In the transceiver 11 of FIG. 2 as well as in the transceiver 31 of FIG. 3, a dummy load or balancing impedance circuit is needed that can be adjusted to mimic the impedance presented by the antenna or antenna port. Although tunable dummy loads or balancing impedance circuits are known, they do not consider that the antenna impedance is complex (inductive or capacitive) and varies with frequency as well as antenna surroundings. Further, they are not capable of providing one tunable impedance at the receive frequency and a different tunable impedance at the transmit frequency, which is needed since the receive and transmit frequencies are far enough apart for the antenna to present quite different impedances, but still with a frequency distance that is small compared to the carrier frequency.

To provide different tunable impedances at nearby frequencies, an impedance circuit with a sharp frequency response, corresponding to a high quality factor, is described below. The idea is to use a frequency translation technique to provide this sharpness. By using mixers, a narrow-band baseband impedance implemented with resistors and capacitors can be up-converted to radio frequencies, thus eliminating the need for very high quality factor inductors. By making the bandwidth of the baseband impedances sufficiently narrow two (or more) translated impedance circuits can be combined and used at nearby frequencies, still with limited interaction. A special technique is proposed for the frequency translation, involving two mixer cores and two transconductors.

Figure 4:
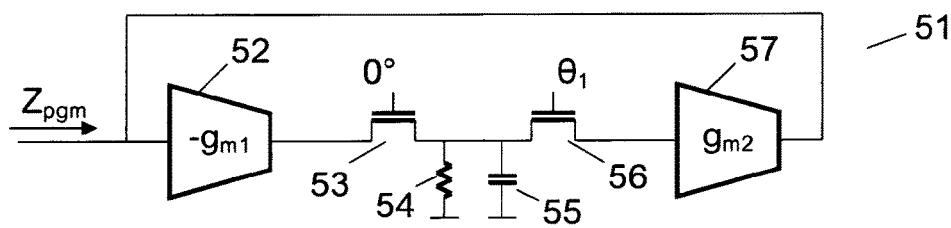
FIG. 4 shows a schematic diagram of an embodiment of a programmable impedance circuit.

FIG. 4 illustrates a schematic diagram of an embodiment of the suggested solution. The voltage at the input of the programmable impedance circuit 51 is fed to the input of a transconductance amplifier 52, which in this embodiment is inverting and has the gain $-g_{m1}$. After the transconductor 52 the input voltage signal is represented by a current. This current is then commutated in a passive mixer 53 and down-converted to a voltage at the mixer output. The mixer 53 is clocked by a local oscillator signal having the frequency at which the impedance circuit is intended to provide a specific and adjustable impedance. This frequency could e.g. be the receiving or transmitting frequency of one of the transceivers described above.

A signal at this frequency will be down-converted to a DC voltage across the load resistor 54 in parallel with a capacitor 55, which will be described later. This DC voltage is then frequency up-converted back to the original frequency by the second passive mixer 56. Note, however, that this mixer may be fed with a local oscillator signal with a phase offset $\theta_1$ with respect to the local oscillator signal of the first mixer. The resulting radio frequency voltage at the output of the mixer 56 may thus be phase-shifted with respect to the voltage at the input of the programmable impedance circuit. The output of mixer 56 is then fed to a second (non-inverting) transconductance amplifier 57 having the gain $g_{m2}$ that converts the signal to a current, which is fed back to the input of the circuit.

The magnitude of the current that is fed back to the input is proportional to the product of the two transconductances and the mixer load resistance 54, slightly reduced by the mixer losses. To make the magnitude of the current programmable, the transconductances and/or the load resistance can thus be controlled. The phase of the feedback current can be controlled by the phase difference $\theta_1$ between the local oscillator signals of the two mixers. The magnitude and the phase of the feedback current correspond to the magnitude and the phase of the impedance that is provided by the circuit. By phase shifting the local oscillator signals of the two mixers with respect to each other, impedances with different phase can be synthesized. If the phase difference $\theta_1$ between the local oscillator signals of the two mixers is zero, i.e. the two local oscillator signals are in phase, the provided impedance will be resistive.

For input signals at frequencies not close to the local oscillator frequency, the signal after the first mixer will be at higher frequency, and the capacitor 55 at the mixer load will provide low impedance to ground, thus preventing a voltage from building up. The output of the second mixer 56 will then be small, and the current being fed back to the input will also be small. In this way a narrow bandwidth can be ensured.

In this embodiment, one inverting and one non-inverting transconductance amplifier are used. The reason for this is low frequency stability. Using two inverting or non-inverting amplifiers would result in positive feedback for low frequency signals. It is, however, possible to break this feedback by placing a high-pass filter somewhere in the high-frequency signal path. In the simplest form this can be realized by a series capacitor, for instance in the feedback from the second transconductor to the input of the circuit. By doing so it is possible to use two transconductors of the same type. This may be simpler than realizing a non-inverting single-ended transconductor, which could be based on a common-gate stage driven by a non-inverting voltage buffer, or by a common-source amplifier driven by an inverting voltage amplifier. In a differential implementation the opposite sign of the transconductors can be achieved by a simple cross coupling.

The controllable local oscillator phase shift $\theta_1$ can be realized in different ways. Coarse phase control in 90 degree steps can be realized using switches selecting between quadrature phases of the clock signal, which are often available. Fine control in a +/−45 degree range can then be obtained using local oscillator buffers where the bias current and/or load capacitance are made tunable to adjust the delay. To obtain a +/−45 degrees phase difference range between the two local oscillator signals, a range of +/−22.5 degrees is sufficient for each signal (plus some margin). Since this is a rather limited range it should be possible to achieve also with stringent phase noise requirements.

The embodiment shown in FIG. 4 is well suited for situations where the input signal to the circuit is a single frequency signal, which has the same frequency and is in phase with the local oscillator signal of the first mixer 53. If the input signal although having the same frequency is not in phase with the local oscillator signal, the voltage at the resistor 54 after the down-conversion mixer 53 will be dependent on the phase difference between the signal and the local oscillator signal, and the output signal phase will not track the phase of the input signal. Further, if the input signal should contain other frequencies, e.g. in a frequency band around the frequency of the local oscillator signal, as it is the case for the transceivers described above, image signal issues will occur, since a signal above the local oscillator frequency will give rise to current not only at its own frequency, but also at the same offset frequency below the local oscillator frequency, and vice versa.

Figure 5:
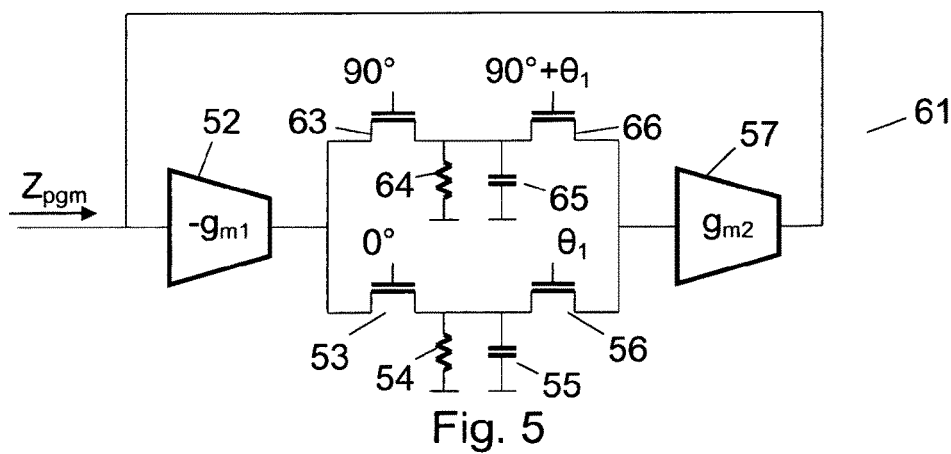
FIG. 5 shows a schematic diagram of an embodiment of a programmable impedance circuit with two conversion branches.

In such situations, the down-conversion and up-conversion of the signal can be performed at different phases, as it is illustrated with the programmable impedance circuit 61 shown in FIG. 5, which has two conversion branches. In this embodiment, the output current from the transconductance amplifier 52 is fed not only to the passive mixer 53, but also to an additional passive mixer 63. As described for the mixer 53, the mixer 63 also down-converts the output current from the transconductance amplifier 52 to a voltage at its mixer output, i.e. across the load resistor 64 and the capacitor 65. The difference is that the local oscillator signal of mixer 63 is phase shifted 90 degrees compared to the local oscillator signal of mixer 53. The phase difference between the two local oscillator signals does not need to be exactly 90 degrees. However, if the phase difference is chosen to 180 degrees the same problems as for the circuit of FIG. 4 will occur.

This voltage across the load resistor 64 and the capacitor 65 is then frequency up-converted back to the original frequency by a further second passive mixer 66. Again, this mixer 66 is fed with a local oscillator signal with a phase offset $\theta_1$ with respect to the local oscillator signal of the first mixer 63, so that the resulting radio frequency voltage at the output of the mixer 66 is phase-shifted with respect to the voltage at the input of the programmable impedance circuit.

The output of mixer 66 is then together with the output of mixer 56 fed to the second transconductance amplifier 57 that converts the signal to the current, which is fed back to the input of the circuit. By down and up-converting the signal in the two branches having a phase difference between them the image signal issues can be avoided.

Figure 6:
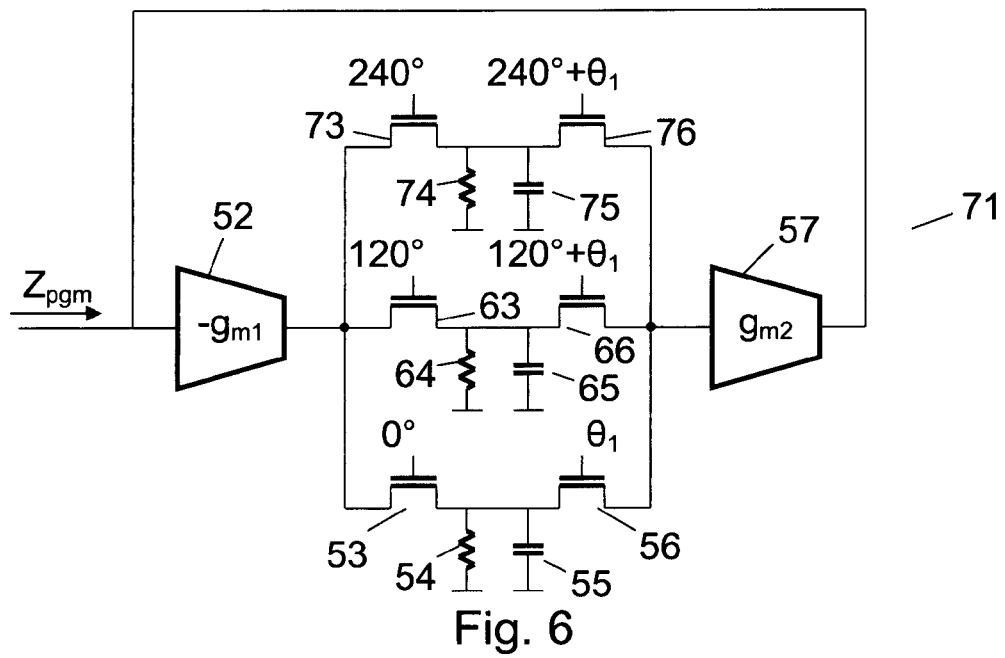
FIG. 6 shows a schematic diagram of an embodiment of a programmable impedance circuit with three conversion branches.

If a symmetrical phase distribution over 360 degrees for the local oscillator signals between the branches is desired, which may often be the case, the number of branches should be at least three. This is illustrated with the programmable impedance circuit 71 shown in FIG. 6, which has three conversion branches. The third branch comprises the down-converting passive mixer 73, the load resistor 74, the capacitor 75 and the up-converting passive mixer 76. The mixers 53, 63 and 73 are now clocked by three local oscillator signals with a phase difference of 120 degrees between them.

Figure 7:
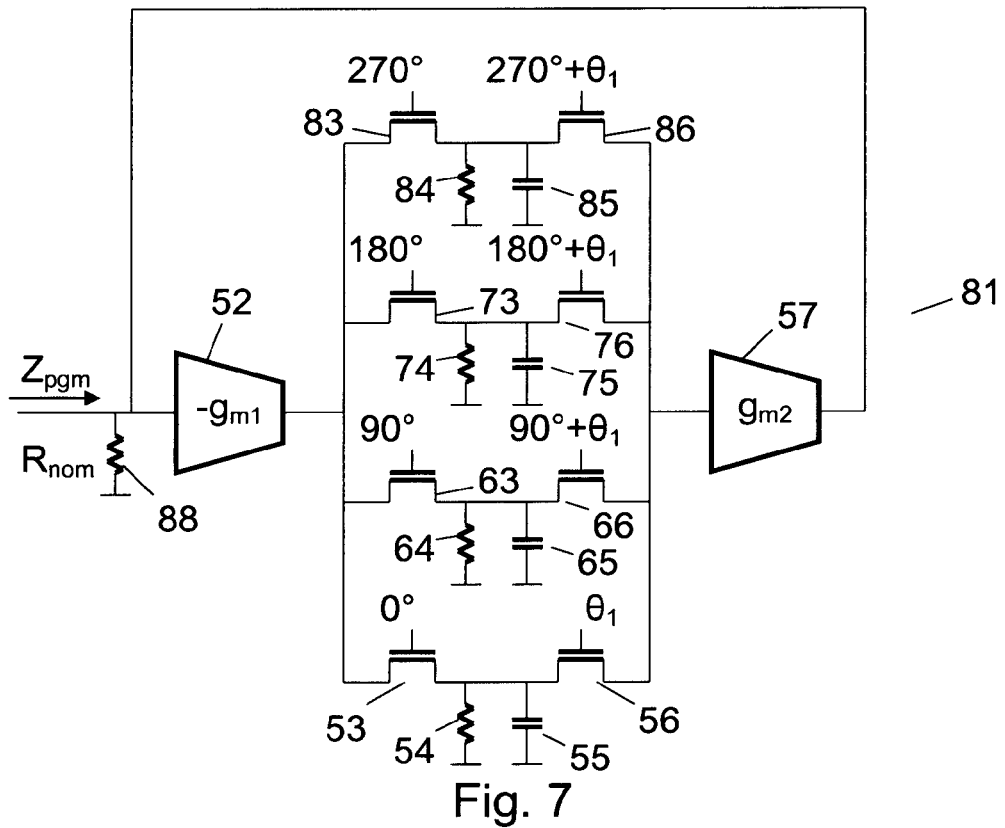
FIG. 7 shows a schematic diagram of an embodiment of a programmable impedance circuit with four conversion branches.

Similarly, FIG. 7 shows a programmable impedance circuit 81 having four conversion branches, wherein the fourth branch comprises the down-converting passive mixer 83, the load resistor 84, the capacitor 85 and the up-converting passive mixer 86. The four mixers 53, 63, 73 and 83 are now clocked by four local oscillator signals with a phase difference of 90 degrees between them, corresponding to quadrature local oscillator phases.

As mentioned, the impedance circuits 51, 61, 71 and 81 can be adjusted to provide a certain impedance at a given local oscillator frequency, e.g. the receiving or the transmitting frequency of the transceivers described above. At frequencies close to this local oscillator frequency the circuit will provide almost the same impedance, while at frequencies farther away from the local oscillator frequency it will provide a very high impedance value, as it was described above. In some applications, it may be advantageous to place a nominal impedance in parallel at the input of the circuit, as it is illustrated with the nominal impedance 88 shown in FIG. 7. The circuit will then create an impedance at the local oscillator frequency, which is offset from the nominal impedance by a certain magnitude and phase, both being controllable. As an example, this may be advantageous when the function of the circuit is illustrated on a Smith-chart, as it will be shown later. With the nominal impedance placed in parallel at the input of the circuit it will be possible to synthesize impedances in an area covering the central regions of the Smith-chart. It should be pointed out, however, that due to the properties of the Smith-chart, different standing-wave ratios (VSWR) can be reached for different angles, since it requires more current to reach a certain VSWR at the low-ohmic side compared to the high-ohmic one.

As mentioned above, transceivers, such as the transceiver 11 of FIG. 2 and the transceiver 31 of FIG. 3, may need a dummy load or balancing impedance circuit that can be adjusted to mimic the impedance presented by the antenna or antenna port. The impedance circuits 51, 61, 71 and 81 with a sharp frequency response can be combined in a circuit arrangement that is capable of providing one impedance at the receive frequency and a different impedance at the transmit frequency, which is needed since the receive and transmit frequencies are far enough apart for the antenna to present quite different impedances, but still with a frequency distance that is small compared to the carrier frequency. By making the bandwidth of the baseband impedances sufficiently narrow two (or more) translated impedance circuits can be combined and used at nearby frequencies, still with limited interaction.

Figure 8:
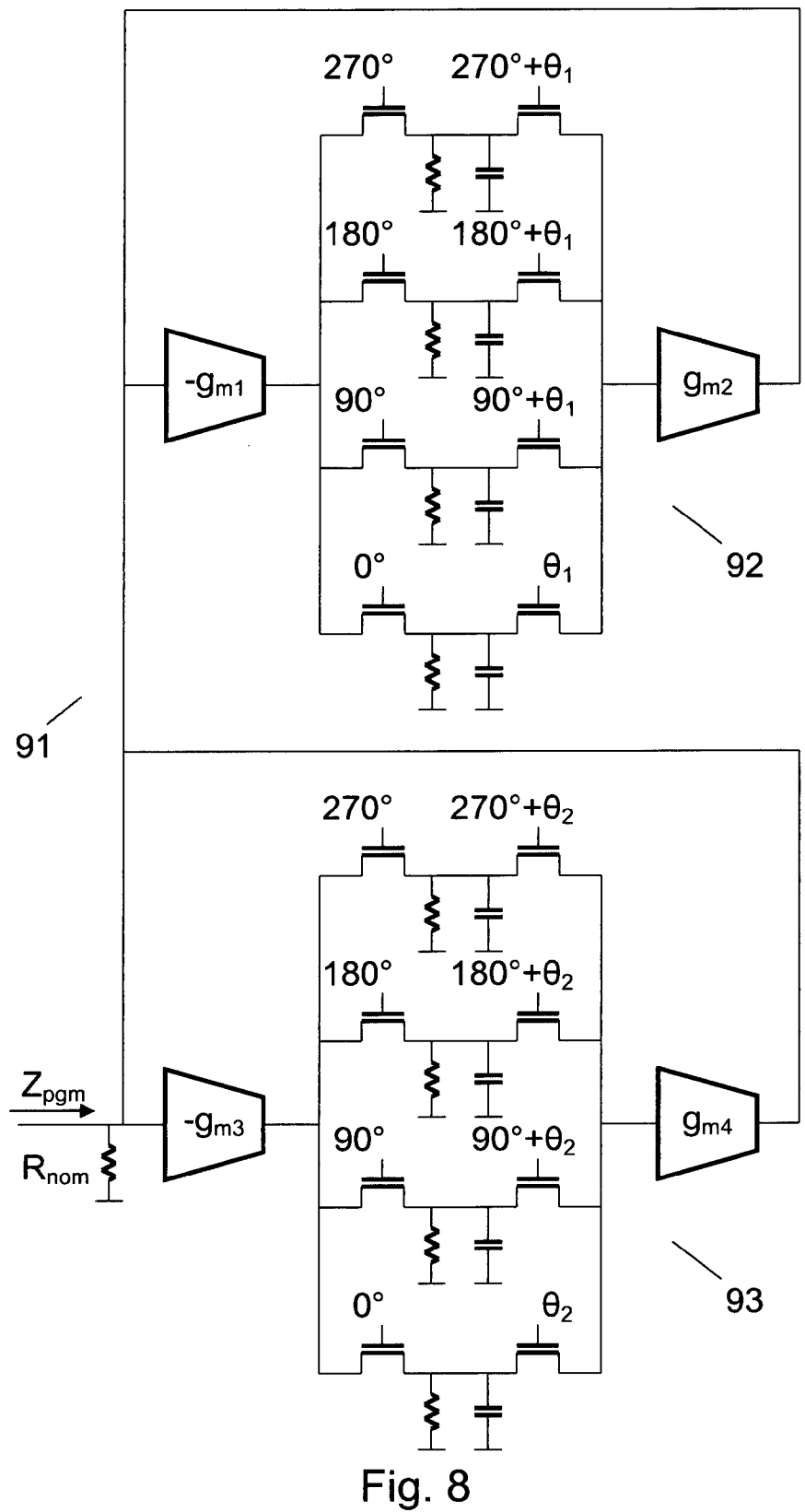
FIG. 8 shows a schematic diagram of an embodiment of a circuit arrangement having two programmable impedance circuits.

This is illustrated in FIG. 8. The circuit arrangement 91 comprises two impedance circuits 92 and 93, each corresponding to the impedance circuit 81 shown in FIG. 7. The two impedance circuits 92 and 93 are identical in structure, but the phase shift $\theta_1$ and the transconductor gains $-g_{m1}$ and $g_{m2}$ of the impedance circuit 92 are adjusted separately from the phase shift $\theta_2$ and the transconductor gains $-g_{m3}$ and $g_{m4}$ of the impedance circuit 93. The local oscillator frequencies of the two circuits are also different.

The mixers in the upper circuit 92 of the circuit arrangement 91 are clocked at one frequency, which could be the receiving frequency, and the mixers in the lower circuit 93 are clocked at another frequency, which could be the transmitting frequency. The upper circuit 92 then provides a certain impedance at the receiving frequency and nearby frequencies, whereas its impedance is high at frequencies further away from the receiving frequency. In the same way the lower circuit 93 then provides a certain impedance at the transmitting frequency and nearby frequencies, whereas its impedance is high at frequencies further away. The impedances presented at the receiving and transmitting frequencies can be controlled separately in a robust and predictable manner.

The two circuits operate at different frequencies, and with sufficiently narrow-band RC-loads of the mixers there will be a very limited interaction between the impedances at the two frequencies. This means that the impedances can be programmed substantially independently.

To illustrate and verify the functionality of the circuit of FIG. 8, simulations of the circuit have been performed with SpectreRF. A circuit with ideal transconductors and mixers implemented on transistor level was simulated. The width and length of each mixer device was 10 um and 100 nm respectively, using standard threshold voltage low power devices in 65 nm bulk CMOS technology. The mixers were fed by a 4 phase clock with 1.2V on and 0V off levels. The frequencies were 2 GHz and 1.905 GHz (2 GHz*20/21), respectively. The capacitors in the filters between the mixers were 20 pF each, making the bandwidth so low that the receiving and transmitting impedances could be controlled largely independently.

Figure 9:
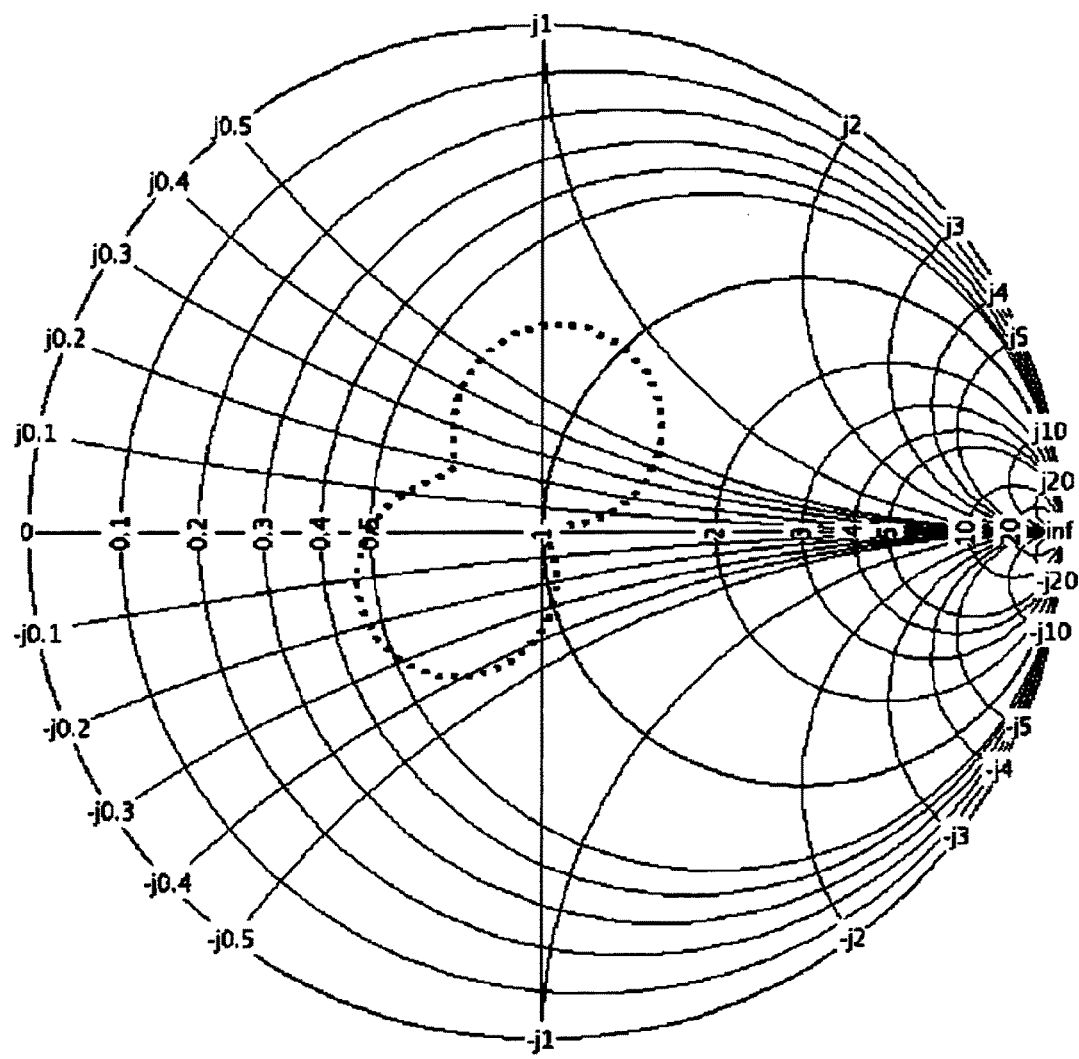
FIG. 9 shows a Smith chart illustrating a frequency sweep of the impedance of the circuit arrangement of FIG. 8.

In FIG. 9 the resulting impedance of the simulation is shown in the Smith chart for a frequency sweep from 1.8 GHz to 2.1 GHz in a psp-analysis. The transconductors have 14 mS of gain, the load resistors are 1 kΩ and 600Ω respectively, and the time skew between the clocks are 450 ps and 150 ps respectively. The different time skews correspond to almost opposite sides of the Smith chart, since half a period is about 250 ps. Two lobes are clearly visible, one for transmitting frequency and one for receiving frequency.

Figure 10:
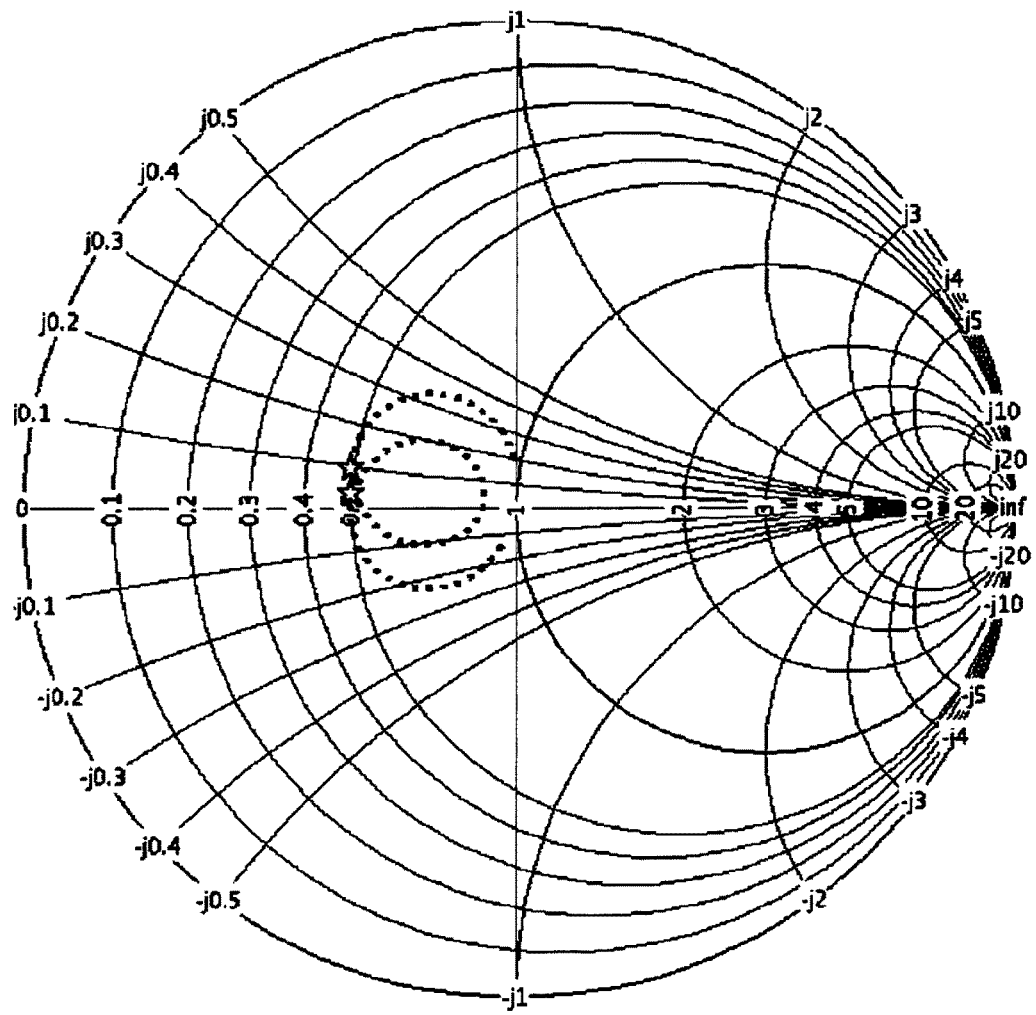
FIG. 10 shows a Smith chart illustrating another frequency sweep of the impedance of the circuit arrangement of FIG. 8.

In FIG. 10 both resistors are set to 1 kΩ and the time skews to zero, corresponding to a low-ohmic resistive impedance. The receiving and transmitting frequency impedances are now on the same side of the Smith chart. Due to some delays in the mixers the receiving and transmitting frequency impedances (marked by stars) are not exactly on the real axis, however, but not far off.

As mentioned, the magnitude of the provided impedance of the impedance circuit can be programmed by controlling the gain of the transconductances and/or the load resistances, while impedances with different phase can be synthesized by controlling the phase difference between the local oscillator signals of the two mixers with respect to each other. In order to let the circuit arrangement provide impedance values that follow the impedance of an antenna at different times and frequencies, a control circuit capable of providing the needed control signals is described below.

Figure 11:
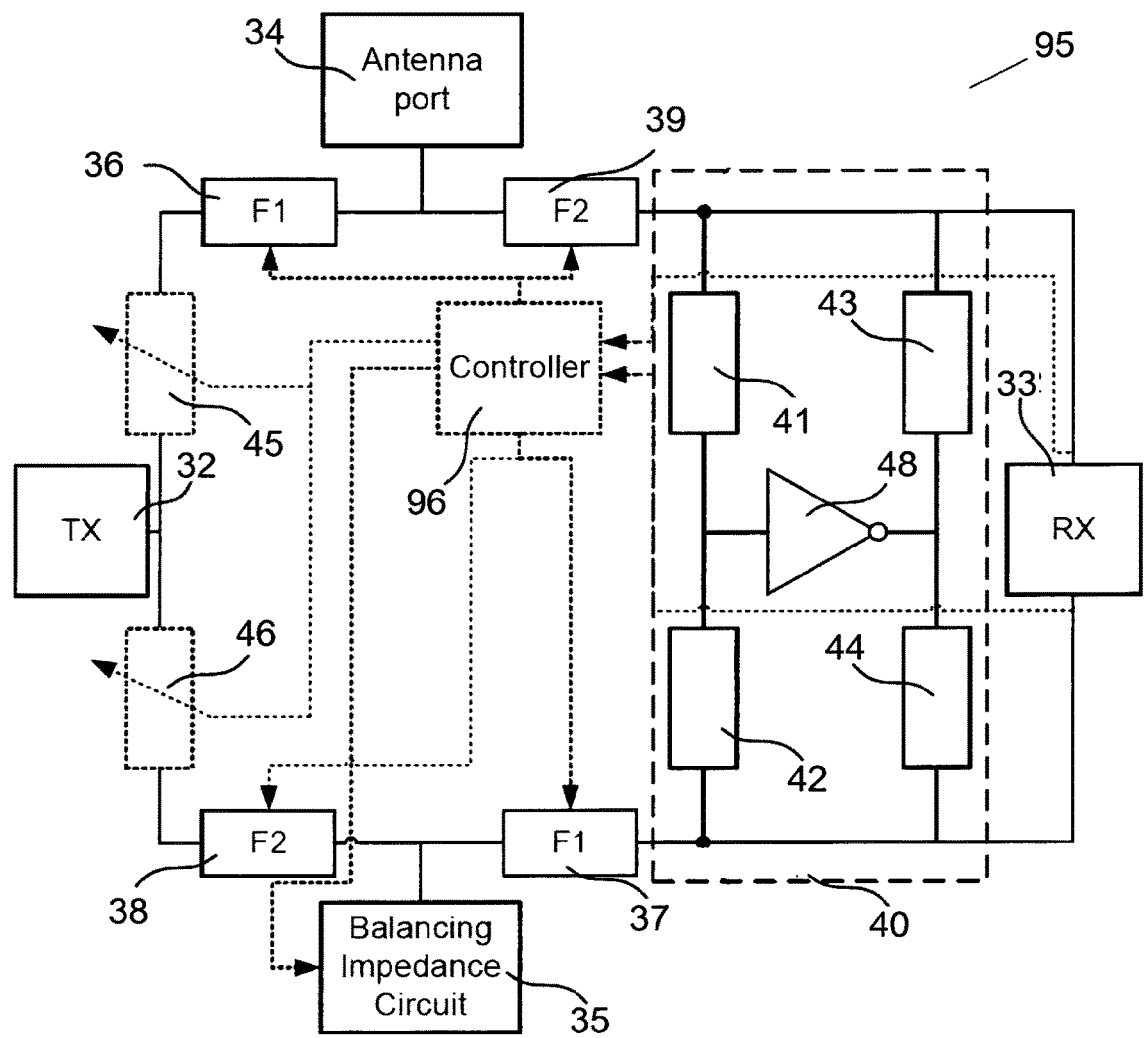
FIG. 11 shows the transceiver of FIG. 3 with a control circuit.

FIG. 11 shows a transceiver 95, which is similar to the transceiver 31 of FIG. 3, except that it further includes a controller 96 that is arranged to control several components of the transceiver, including the magnitude and the phase of an adaptive balancing impedance circuit that can be implemented e.g. as the circuit arrangement 91 of FIG. 8.

The controller 96 can comprise circuitry measuring transmitter contribution signal at the input of the receiver 33, as indicated by hashed lines, and provide control to the balancing impedance circuit 35 using a control scheme where the differential transmitter signal contribution at the receiver input is minimised at all times. For example, an amplitude detector arrangement comprising one or more amplitude detectors can be arranged at a terminal or terminals of an input port or output port of the receiver to measure amplitude. The amplitude is preferably measured at receive and/or transmit frequencies.

The controller 96 can thus be provided with input data about signals to enable it to control the adaptive impedance of the balancing impedance circuit 35 such that the differential signal amplitude at terminals of the input port of the receiver 33 is minimised based on measurements of the amplitude detector arrangement. The principle employed is that when this amplitude is as small as possible, the transmitter contribution at receiver input is also as small as possible for any reasonable settings of the filters.

The controller 96 can also be arranged to control the filters 36, 37, 38, 39 such that suitable filter characteristics for passing and attenuating signals as described above are achieved for different constellations of frequencies for transmitting and receiving. For example, if the transceiver operates in FDD where transmit frequency is a certain amount higher than the receive frequency, and the transceiver switches to an operation mode where the transceiver operates in FDD and where the receive frequency is a certain amount higher than the transmit frequency, the controller 96 can swap the properties of filter types F1 and F2. Similar change of respective properties of filters of types F1 and F2 can be made by the controller 96 upon change of the certain amount of frequency difference between receive and transmit frequencies, etc. As noted, signals to and from the controller are indicated as dotted arrows which indicate measurements provided to the controller 96 and control signals provided from the controller 96.

Figure 12:
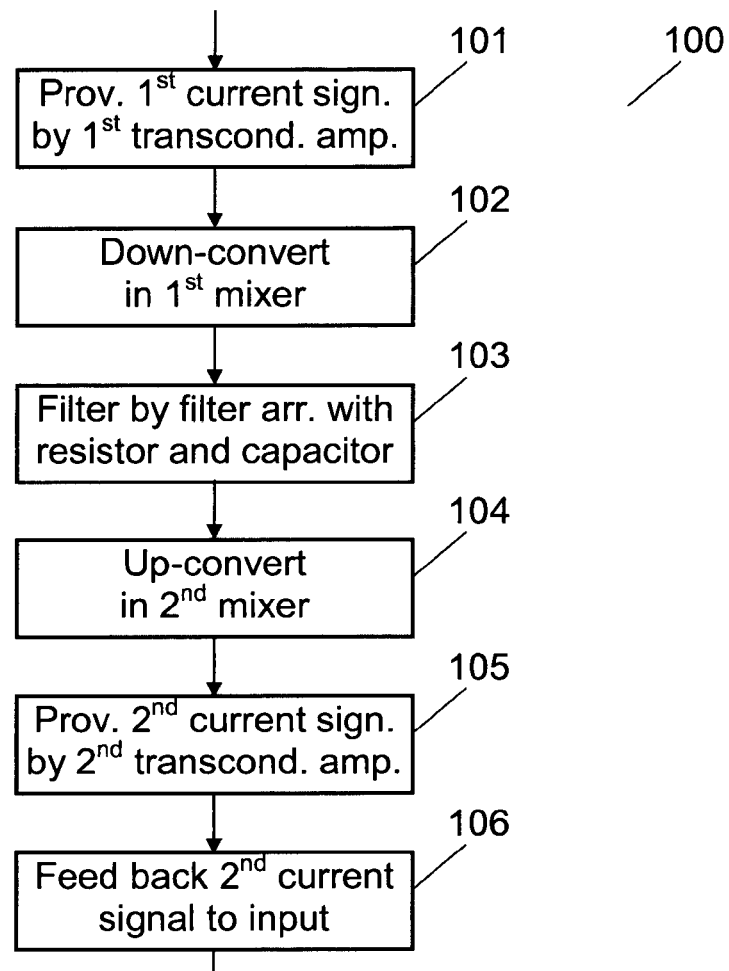
FIG. 12 shows a flow chart of a method of providing an adjustable impedance.

FIG. 12 shows a flow chart illustrating a method of providing an adjustable impedance in a programmable impedance circuit. In step 101, a voltage at an input of the programmable impedance circuit is fed to the input of a transconductance amplifier, which in this embodiment is inverting and has the gain $-g_{m1}$. After the transconductor the input voltage signal is represented by a current. This current is then in step 102 commutated in a passive mixer and down-converted to a voltage at the mixer output. The mixer is clocked by a local oscillator signal having the frequency at which the impedance circuit is intended to provide a specific and adjustable impedance. This frequency could e.g. be the receiving or transmitting frequency of one of the transceivers described above.

A signal close to the local oscillator frequency will be down-converted to a low-frequency voltage across the load resistor in parallel with a capacitor, where it is low pass filtered in step 103. In step 104 this low-frequency voltage is then frequency up-converted back to the original frequency by the second passive mixer. Note, however, that this mixer may be fed with a local oscillator signal with a phase offset with respect to the local oscillator signal of the first mixer. The resulting radio frequency voltage at the output of the second mixer may thus be phase-shifted with respect to the voltage at the input of the programmable impedance circuit. The output of the second mixer is then fed to a second (non-inverting) transconductance amplifier having the gain $g_{m2}$ that in step 105 converts the signal to a current, which in step 106 is fed back to the input of the circuit.

FIG. 13 is a flow chart which schematically illustrates a method according to embodiments for controlling adaptable elements of the transceiver arrangements as described above. The controllable elements can be impedances, where impedance matching for proper operation as is discussed above, filters, where pass and stop frequencies are controlled for example for the current operation, and the amplifier of the common-mode signal reduction circuit, where gain is adapted to provide a proper balance between sufficient common-mode signal reduction, power consumption, and generation of noise. The method can comprise measuring 701 amplitude at terminal(s) of an input port of the receiver and adjusting 703 the adaptive impedance of the balancing impedance such that the amplitude is reduced. Here, it is assumed that when the amplitude is reduced, it is the transmitter signal component that is reduced by the adjustment, i.e. by providing symmetry as is discussed above. By measuring 701 the amplitude(s), the amplitude can be compared 702 with a previous measurement, and the adjusting 703 can be done accordingly to try to track towards a minimum during operation of the transceiver arrangement. The method can also comprise controlling pass and stop frequencies of the filters of the first and second types, respectively, based on receive and transmit frequencies of current operation of the transceiver arrangement.

FIG. 14 schematically illustrates a computer program and a processor. The above method is suitable for implementation with aid of processing means, such as computers and/or processors, especially for the case where the controller 340, 440 is implemented as processor or programmable circuit. Therefore, there is provided computer programs, comprising instructions arranged to cause the processing means, processor, or computer to perform the steps of any of the methods according to any of the embodiments described with reference to FIG. 13. The computer programs preferably comprises program code which is stored on a computer readable medium 800, as illustrated in FIG. 14, which can be loaded and executed by a processing means, processor, or computer 802 to cause it to perform the methods, respectively, according to embodiments of the present invention, preferably as any of the embodiments described with reference to FIG. 13. The computer 802 and computer program product 800 can be arranged to execute the program code sequentially where actions of the any of the methods are performed stepwise. The processing means, processor, or computer 802 is preferably what normally is referred to as an embedded system. Thus, the depicted computer readable medium 800 and computer 802 in FIG. 14 should be construed to be for illustrative purposes only to provide understanding of the principle, and not to be construed as any direct illustration of the elements.

FIG. 15 is a block diagram schematically illustrating a communication device 900. The communication device 900 is capable of frequency division duplex communication via a communication network. The communication device 900 comprises a transceiver arrangement 902 according to any of the above demonstrated embodiments. The transceiver arrangement 902 is connected to an antenna 904 through its antenna port. The communication device can also comprise other circuits 906, such as interface towards a user and/or other circuitry or machines, memory, processor, etc. The communication device 900 can be a Smartphone or cell phone, a communication card or device in or for a computer, an embedded communication device in a machine, or the like. The communication device 900 can be adapted for cellular communication, point-to-point communication, or for communication in a wireless or wired network.

In other words, an electronic circuit is disclosed that is configured to provide an adjustable impedance at a first frequency, said circuit comprising a first transconductance amplifier arranged to receive an input signal at an input terminal of the electronic circuit and provide a first current signal proportional to said input signal; at least one conversion arrangement, each comprising a first mixer arrangement arranged to utilize a first local oscillator signal at said first frequency to down-convert said first current signal to a baseband voltage signal at an output of the mixer arrangement; a filtering arrangement connected to the output of said first mixer arrangement and comprising at least a resistor and a capacitor in parallel; and a second mixer arrangement arranged to utilize a second local oscillator signal at said first frequency to up-convert a voltage signal present at said filter arrangement to an up-converted voltage signal at its output; and a second transconductance amplifier arranged to receive said up-converted voltage signal and provide a second current signal proportional thereto and to feed back said second current signal to the input terminal of the electronic circuit.

By using the first and second mixer arrangements in this way the filtering arrangement implemented with a resistor and a capacitor (which can also be considered as a narrow band baseband impedance) can be up-converted to radio frequencies. In this way, a sharp frequency response, corresponding to a high quality factor, can be achieved using a frequency translation technique without the need for very high quality factor inductors. By making the bandwidth of the baseband impedance sufficiently narrow two or more translated impedance circuits can be used at nearby frequencies with limited interaction.

One of said first and second transconductance amplifiers may be an inverting transconductance amplifier, while the other one may be a non-inverting transconductance amplifier. This ensures low frequency stability of the circuit.

When at least one of said first and second transconductance amplifiers has a controllable gain, the magnitude of the provided impedance can be adjusted by controlling the controllable transconductance amplifier gain. A similar result can be achieved when at least one of the resistor and the capacitor of said filtering arrangement is controllable.

When said second local oscillator signal has a phase offset with respect to said first local oscillator signal, impedances can be provided with different phase angles. When said phase offset is controllable, also the phase angle of the provided impedance can be controlled.

The electronic circuit may comprise two conversion arrangements, with the first local oscillator signals of the two conversion arrangements having a phase difference different from 0 degrees and different from 180 degrees. In this way the circuit can also provide the desired impedance in situations where the input signal to the circuit does not have the same frequency and the same phase as the first local oscillator signal. In one embodiment the first local oscillator signals of the two conversion arrangements have a phase difference equal to 90 degrees.

Alternatively, the electronic circuit may comprise at least three conversion arrangements, with the first local oscillator signals of the conversion arrangements having symmetrical phase distribution over 360 degrees. In one embodiment, the electronic circuit comprises four conversion arrangements, with the first local oscillator signals of the four conversion arrangements having quadrature phases.

A nominal impedance may be placed in parallel to the input terminal of the electronic circuit.

A circuit arrangement may comprise at least two electronic circuits as described above connected to a common input terminal, the at least two electronic circuits utilizing local oscillator signals at different frequencies to provide an adjustable impedance at each of said different frequencies. In this way the circuit arrangement can at the same time provide different impedances at different frequencies, such as a receiving and a transmitting frequency of a transceiver.

A transceiver arrangement may comprise a receiver arranged for frequency-division duplex communication with a communication network; a transmitter arranged for frequency-division duplex communication with the communication network; a transmission port for connecting to an antenna; a balancing impedance circuit comprising a circuit arrangement as described above and arranged to mimic the impedance at the transmission port; and a filtering arrangement, which comprises filters of a first type and filters of a second type, connecting the receiver, transmitter, transmission port and balancing impedance circuit, wherein the filters of the first type are arranged to pass signals at transmitter frequency and attenuate signals at receiver frequency and are connected between the transmitter and the transmission port and between the receiver and the balancing impedance circuit; and the filters of the second type are arranged to attenuate signals at transmitter frequency and pass signals at receiver frequency and are connected between the transmitter and the balancing impedance circuit and between the receiver and the transmission port.

The transceiver arrangement may further comprise an amplitude detector arrangement at at least a terminal of an input port of the receiver, wherein the transceiver arrangement comprises a controller arranged to control the adjustable impedance of the balancing impedance circuit such that the amplitude at the at least one terminal of an input port of the receiver is reduced based on measurements by the amplitude detector arrangement. In this way the balancing impedance circuit can be controlled to mimic an antenna impedance.

The controller may be arranged to control a magnitude of the adjustable impedance of the balancing impedance circuit by controlling at least one of a controllable gain of said first transconductance amplifier, a controllable gain of said second transconductance amplifier, and the resistor of said filtering arrangement.

The controller may further be arranged to control a phase of the adjustable impedance of the balancing impedance circuit by controlling a phase offset of said second local oscillator signal with respect to said first local oscillator signal.

A communication device, capable of frequency division duplex communication via a communication network, may comprise a transceiver arrangement as described above.

A method of providing an adjustable impedance at a first frequency, may comprise the steps of providing by a first transconductance amplifier a first current signal proportional to an input signal received at an input terminal of an electronic circuit; down-converting in a first mixer arrangement of at least one conversion arrangement said first current signal to a baseband voltage signal by utilizing a first local oscillator signal at said first frequency; filtering in a filtering arrangement of said at least one conversion arrangement comprising at least a resistor and a capacitor in parallel said baseband voltage signal to provide a voltage signal at the filtering arrangement; up-converting in a second mixer arrangement of said at least one conversion arrangement said voltage signal present at said filter arrangement to an up-converted voltage signal by utilizing a second local oscillator signal at said first frequency; providing by a second transconductance amplifier a second current signal proportional to said up-converted voltage signal; and feeding back said second current signal to the input terminal of the electronic circuit.

By using the first and second mixer arrangements in this way the filtering arrangement implemented with a resistor and a capacitor (which can also be considered as a narrow band baseband impedance) can be up-converted to radio frequencies. In this way, a sharp frequency response, corresponding to a high quality factor, can be achieved using a frequency translation technique without the need for very high quality factor inductors. By making the bandwidth of the baseband impedance sufficiently narrow two or more translated impedance circuits can be used at nearby frequencies with limited interaction.

The method may further comprise the step of controlling a magnitude of the adjustable impedance by controlling at least one of a controllable gain of said first transconductance amplifier, a controllable gain of said second transconductance amplifier, and the resistor of said filtering arrangement.

The method may further comprise the step of controlling a phase of the adjustable impedance by controlling a phase offset of said second local oscillator signal with respect to said first local oscillator signal.

Although various embodiments of the present invention have been described and shown, the invention is not restricted thereto, but may also be embodied in other ways within the scope of the subject-matter defined in the following claims.

The invention claimed is:

1. An electronic circuit configured to provide an adjustable impedance at a first frequency, the electronic circuit comprising:
    a first transconductance amplifier configured to receive an input signal at an input terminal of the electronic circuit and to provide a first current signal proportional to the input signal;
    at least one conversion arrangement, each conversion arrangement comprising:
        a first mixer arrangement configured to utilize a first local oscillator signal at the first frequency to down-convert the first current signal to a baseband voltage signal at an output of the first mixer arrangement;
        a filtering arrangement connected to the output of the first mixer arrangement, the filtering arrangement comprising at least a resistor and a capacitor in parallel; and
        a second mixer arrangement configured to utilize a second local oscillator signal at the first frequency to up-convert a voltage signal present at the filter arrangement to an up-converted voltage signal at its output; and
    a second transconductance amplifier configured to receive the up-converted voltage signal and provide a second current signal proportional thereto and to feed back the second current signal to the input terminal of the electronic circuit.

2. The electronic circuit of claim 1, wherein one of the first and second transconductance amplifiers is an inverting transconductance amplifier, and the other of the first and second transconductance amplifiers is a non-inverting transconductance amplifier.

3. The electronic circuit of claim 1, wherein at least one of the first and second transconductance amplifiers has a controllable gain.

4. The electronic circuit of claim 1, wherein at least one of the resistor and the capacitor of the filtering arrangement is controllable.

5. The electronic circuit of claim 1, wherein the second local oscillator signal has a phase offset with respect to the first local oscillator signal.

6. The electronic circuit of claim 5, wherein the phase offset is controllable.

7. The electronic circuit of claim 1, wherein the electronic circuit comprises two conversion arrangements, with the first local oscillator signals of the two conversion arrangements having a phase difference different from 0 degree and different from 90 degrees.

8. The electronic circuit of claim 7, wherein the first local oscillator signals of the two conversion arrangements have a phase difference equal to 90 degrees.

9. The electronic circuit of claim 1, wherein the electronic circuit comprises three conversion arrangements, with the first local oscillator signals of the conversion arrangements having symmetrical phase distribution over 360 degrees.

10. The electronic circuit of claim 1, wherein the electronic circuit comprises four conversion arrangements, with the first local oscillator signals of the four conversion arrangements having quadrature phases.

11. The electronic circuit of claim 10, further comprising a nominal impedance placed in parallel to the input terminal of the electronic circuit.

12. A circuit arrangement, comprising:
    at least two electronic circuits connected to a common input terminal;
    a first of the at least two electronic circuits configured to provide an adjustable impedance at a first frequency and comprising:
        a first transconductance amplifier configured to receive an input signal at an input terminal of the first electronic circuit and to provide a first current signal proportional to the input signal;
        at least one conversion arrangement, each conversion arrangement comprising:
            a first mixer arrangement configured to utilize a first local oscillator signal at the first frequency to down-convert the first current signal to a baseband voltage signal at an output of the first mixer arrangement;
            a first filtering arrangement connected to the output of the first mixer arrangement, the first filtering arrangement comprising at least a resistor and a capacitor in parallel; and
            a second mixer arrangement configured to utilize a second local oscillator signal at the first frequency to up-convert a voltage signal present at the first filter arrangement to an up-converted voltage signal at its output; and
        a second transconductance amplifier configured to receive the up-converted voltage signal and provide a second current signal proportional thereto and to feed back the second current signal to the input terminal of the first electronic circuit;
    a second of the at least two electronic circuits configured to provide an adjustable impedance at a second frequency and comprising:

a third transconductance amplifier configured to receive an input signal at an input terminal of the second electronic circuit and to provide a third current signal proportional to the input signal;

at least one conversion arrangement, each conversion arrangement comprising:

a third mixer arrangement configured to utilize a third local oscillator signal at the second frequency to down-convert the third current signal to a baseband voltage signal at an output of the third mixer arrangement;

a second filtering arrangement connected to the output of the third mixer arrangement, the second filtering arrangement comprising at least a resistor and a capacitor in parallel; and a fourth mixer arrangement configured to utilize a fourth local oscillator signal at the second frequency to up-convert a voltage signal present at the second filtering arrangement to an up-converted voltage signal at its output; and a fourth transconductance amplifier configured to receive the up-converted voltage signal and provide a fourth current signal proportional thereto and to feed back the fourth current signal to the input terminal of the second electronic circuit;

wherein the at least two electronic circuits utilize the local oscillator signals at different frequencies to provide an adjustable impedance at each of the different frequencies.

13. A transceiver arrangement, comprising:

a receiver configured for frequency-division duplex communication with a communication network;

a transmitter configured for frequency-division duplex communication with the communication network;

a transmission port for connecting to an antenna;

a balancing impedance circuit comprising a circuit arrangement and configured to mimic the impedance at the transmission port; and a filtering arrangement, which comprises filters of a first type and filters of a second type, connecting the receiver, the transmitter, the transmission port, and the balancing impedance circuit;

wherein the filters of the first type are configured to pass signals at a transmitter frequency and attenuate signals at a receiver frequency, and are connected between the transmitter and the transmission port, and between the receiver and the balancing impedance circuit; and wherein the filters of the second type are configured to attenuate signals at the transmitter frequency and pass signals at the receiver frequency, and are connected between the transmitter and the balancing impedance circuit, and between the receiver and the transmission port;

wherein the circuit arrangement comprises:

at least two electronic circuits connected to a common input terminal;

a first of the at least two electronic circuits configured to provide an adjustable impedance at a first frequency and comprising:

a first transconductance amplifier configured to receive an input signal at an input terminal of the first electronic circuit and to provide a first current signal proportional to the input signal;

at least one conversion arrangement, each conversion arrangement comprising:

a first mixer arrangement configured to utilize a first local oscillator signal at the first frequency to down-convert the first current signal to a baseband voltage signal at an output of the first mixer arrangement;

a first filtering arrangement connected to the output of the first mixer arrangement, the first filtering arrangement comprising at least a resistor and a capacitor in parallel; and a second mixer arrangement configured to utilize a second local oscillator signal at the first frequency to up-convert a voltage signal present at the first filter arrangement to an up-converted voltage signal at its output; and a second transconductance amplifier configured to receive the up-converted voltage signal and provide a second current signal proportional thereto and to feed back the second current signal to the input terminal of the first electronic circuit;

a second of the at least two electronic circuits configured to provide an adjustable impedance at a second frequency and comprising:

a third transconductance amplifier configured to receive an input signal at an input terminal of the second electronic circuit and to provide a third current signal proportional to the input signal;

at least one conversion arrangement, each conversion arrangement comprising:

a third mixer arrangement configured to utilize a third local oscillator signal at the second frequency to down-convert the third current signal to a baseband voltage signal at an output of the third mixer arrangement;

a second filtering arrangement connected to the output of the third mixer arrangement, the second filtering arrangement comprising at least a resistor and a capacitor in parallel; and a fourth mixer arrangement configured to utilize a fourth local oscillator signal at the second frequency to up-convert a voltage signal present at the second filter arrangement to an up-converted voltage signal at its output; and a fourth transconductance amplifier configured to receive the up-converted voltage signal and provide a fourth current signal proportional thereto and to feed back the fourth current signal to the input terminal of the second electronic circuit;

wherein the at least two electronic circuits utilize the local oscillator signals at different frequencies to provide an adjustable impedance at each of the different frequencies.

14. A communication device, capable of frequency division duplex communication via a communication network, the communication device comprising a transceiver arrangement, wherein the transceiver arrangement comprises:

a receiver configured for frequency-division duplex communication with the communication network;

a transmitter configured for frequency-division duplex communication with the communication network;

a transmission port for connecting to an antenna;

a balancing impedance circuit comprising a circuit arrangement and configured to mimic the impedance at the transmission port; and a filtering arrangement, which comprises filters of a first type and filters of a second type, connecting the receiver, the transmitter, the transmission port, and the balancing impedance circuit;

wherein the filters of the first type are configured to pass signals at a transmitter frequency and attenuate signals at a receiver frequency, and are connected between the transmitter and the transmission port, and between the receiver and the balancing impedance circuit; and wherein the filters of the second type are configured to attenuate signals at the transmitter frequency and pass signals at the receiver frequency, and are connected between the transmitter and the balancing impedance circuit, and between the receiver and the transmission port;

wherein the circuit arrangement comprises:
- at least two electronic circuits connected to a common input terminal;
- a first of the at least two electronic circuits configured to provide an adjustable impedance at a first frequency and comprising:
  - a first transconductance amplifier configured to receive an input signal at an input terminal of the first electronic circuit and to provide a first current signal proportional to the input signal;
  - at least one conversion arrangement, each conversion arrangement comprising:
    - a first mixer arrangement configured to utilize a first local oscillator signal at the first frequency to down-convert the first current signal to a baseband voltage signal at an output of the first mixer arrangement;
    - a first filtering arrangement connected to the output of the first mixer arrangement, the first filtering arrangement comprising at least a resistor and a capacitor in parallel; and
    - a second mixer arrangement configured to utilize a second local oscillator signal at the first frequency to up-convert a voltage signal present at the first filter arrangement to an up-converted voltage signal at its output; and
  - a second transconductance amplifier configured to receive the up-converted voltage signal and provide a second current signal proportional thereto and to feed back the second current signal to the input terminal of the first electronic circuit;
- a second of the at least two electronic circuits configured to provide an adjustable impedance at a second frequency and comprising:
  - a third transconductance amplifier configured to receive an input signal at an input terminal of the second electronic circuit and to provide a third current signal proportional to the input signal;
  - at least one conversion arrangement, each conversion arrangement comprising:
    - a third mixer arrangement configured to utilize a third local oscillator signal at the frequency to down-convert the third current signal to a baseband voltage signal at an output of the third mixer arrangement;
    - a second filtering arrangement connected to the output of the third mixer arrangement, the second filtering arrangement comprising at least a resistor and a capacitor in parallel; and
    - a fourth mixer arrangement configured to utilize a fourth local oscillator signal at the frequency to up-convert a voltage signal present at the second filter arrangement to an up-converted voltage signal at its output; and
  - a fourth transconductance amplifier configured to receive the up-converted voltage signal and provide a fourth current signal proportional thereto and to feed back the fourth current signal to the input terminal of the second electronic circuit;
wherein the at least two electronic circuits utilize the local oscillator signals at different frequencies to provide an adjustable impedance at each of the different frequencies.

15. A method of providing an adjustable impedance at a first frequency, the method comprising:
- providing, by a first transconductance amplifier, a first current signal proportional to an input signal received at an input terminal of an electronic circuit;
- down-converting, in a first mixer arrangement of at least one conversion arrangement, the first current signal to a baseband voltage signal by utilizing a first local oscillator signal at the frequency;
- filtering, in a filtering arrangement of the at least one conversion arrangement, the baseband voltage signal to provide a voltage signal at the filtering arrangement, the filtering arrangement comprising at least a resistor and a capacitor in parallel;
- up-converting, in a second mixer arrangement of the at least one conversion arrangement, the voltage signal present at the filter arrangement to an up-converted voltage signal by utilizing a second local oscillator signal at the frequency;
- providing, by a second transconductance amplifier, a second current signal proportional to the up-converted voltage signal; and
- feeding back the second current signal to the input terminal of the electronic circuit.

* * * * *

UNITED STATES PATENT AND TRADEMARK OFFICE
CERTIFICATE OF CORRECTION

PATENT NO. : 10,079,671 B2  
APPLICATION NO. : 15/117219  
DATED : September 18, 2018  
INVENTOR(S) : Sjöland Page 1 of 1

It is certified that error appears in the above-identified patent and that said Letters Patent is hereby corrected as shown below:

In the Claims

In Column 22, Line 2, in Claim 14, delete "the frequency" and insert -- the second frequency --, therefor.

In Column 22, Line 11, in Claim 14, delete "the frequency" and insert -- the second frequency --, therefor.

In Column 22, Line 26, in Claim 15, delete "first frequency," and insert -- frequency, --, therefor.

Signed and Sealed this  
Ninth Day of April, 2019

Andrei Iancu  
*Director of the United States Patent and Trademark Office*